Nov. 3, 1925.
E. L. CHAFFEE
1,560,206
METHOD AND SYSTEM FOR THE TRANSMISSION OF RADIANT ENERGY
Filed April 25, 1918   5 Sheets-Sheet 1
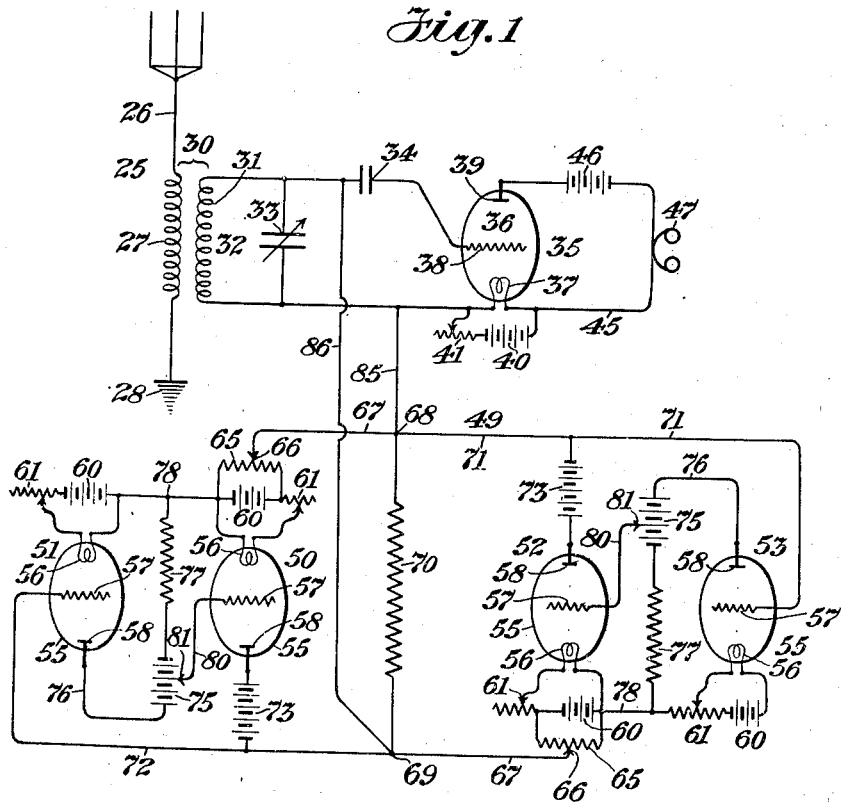
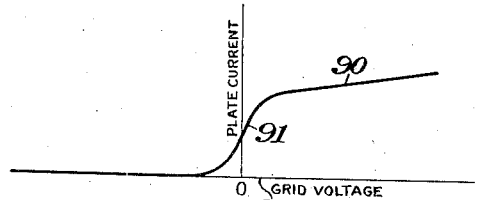
WITNESS:
Chas. F. Clagett
INVENTOR
Emory Leon Chaffee
BY
A. J. Gardner
HIS ATTORNEY Nov. 3, 1925. 1,560,206
E. L. CHAFFEE
METHOD AND SYSTEM FOR THE TRANSMISSION OF RADIANT ENERGY
Filed April 25, 1918 5 Sheets-Sheet 3

WITNESS:
Chas. F. Clagett

INVENTOR
Emory Leon Chaffee
BY
A. J. Gardner
HIS ATTORNEY

Nov. 3, 1925.

E. L. CHAFFEE 1,560,206

METHOD AND SYSTEM FOR THE TRANSMISSION OF RADIANT ENERGY

Filed April 25, 1918     5 Sheets-Sheet 5

WITNESS:
Chas. G. Clagett

INVENTOR
Emory Leon Chaffee
BY
A. G. Gardner
HIS ATTORNEY

Patented Nov. 3, 1925.

1,560,206

UNITED STATES PATENT OFFICE.

EMORY LEON CHAFFEE, OF BELMONT, MASSACHUSETTS, ASSIGNOR TO JOHN HAYS HAMMOND, JR., OF GLOUCESTER, MASSACHUSETTS.

METHOD AND SYSTEM FOR THE TRANSMISSION OF RADIANT ENERGY.

Application filed April 25, 1918. Serial No. 230,722.

*To all whom it may concern:*

Be it known that I, EMORY LEON CHAFFEE, a citizen of the United States, and a resident of Belmont, in the county of Middlesex and State of Massachusetts, have invented certain new and useful Improvements in Methods and Systems for the Transmission of Radiant Energy, of which the following is a specification.

Some of the objects of this invention are to provide in a receiving system for radiant energy means for reducing the disturbing effects of "atmospheric strays" or "static," or interference from high potential highly damped wave trains, or other disturbing effects while receiving a radio signal, without seriously reducing the intensity of the received signal; to provide in a receiving system for radiant energy, means for protecting an oscillation detector from interfering high potential effects; and to provide other improvements such as will appear hereinafter.

Figure 9:
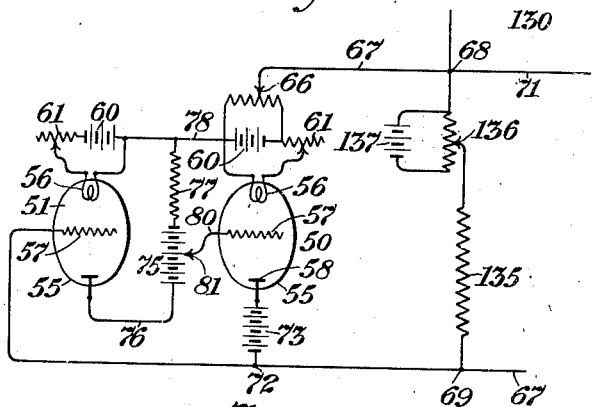
Figure 10:
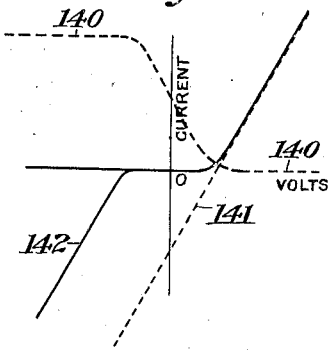
Figure 11:
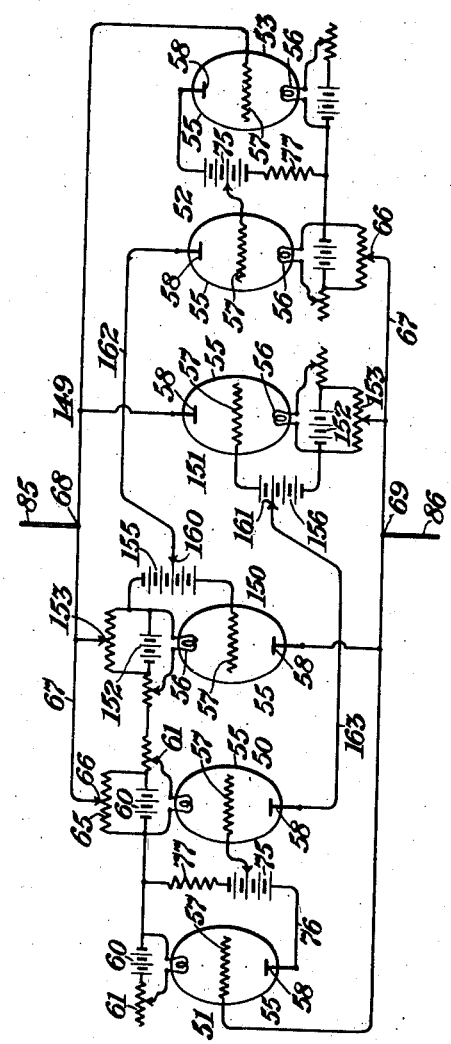
Figure 12:
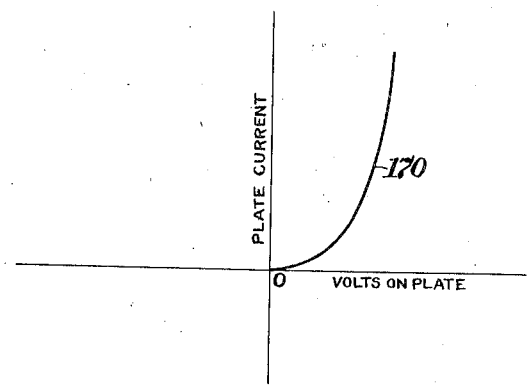
Figure 13:
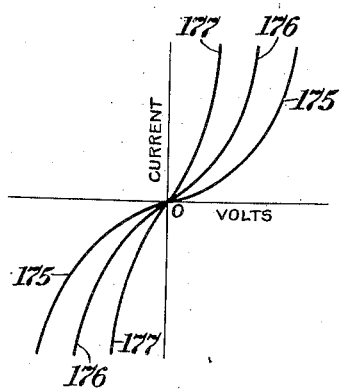

In the accompanying drawings, Fig. 1 is a diagrammatic representation of a receiving system constructed in accordance with this invention; Figs. 2 to 8 are diagrams explanatory of the operation of the system shown in Fig. 1; Fig. 9 is a diagrammatic representation of a modified form of a portion of the system shown in Fig. 1; Fig. 10 is a diagram explanatory of the operation of the modified system shown in Fig. 9; Fig. 11 is a further modified form of a portion of the system shown in Fig. 1; and Figs. 12 and 13 are diagrams explanatory of the operation of the system shown in Fig. 11.

Referring to the drawings and particularly to Fig. 1, one form of receiving system constructed in accordance with this invention comprises an open aerial circuit 25, including an antenna 26 and an inductance 27, through which the antenna 26 is grounded as at 28. The inductance 27 forms the primary of a transformer 30, which includes a coil or inductance 31, which is in a closed oscillatory circuit 32, including a variable condenser 33. This closed circuit 32 is preferably tuned to the frequency of the open aerial circuit 25 and is arranged to act through a stoppage condenser 34 to control any well-known or suitable oscillation detector, for instance, a vacuum tube detector 35 of well-known construction and comprising an evacuated glass bulb 36 which contains a filament 37, a grid or potential gradient changing means 38, and a plate or terminal 39. The filament 37 is arranged to be heated by a battery 40, acting through a variable resistance or rheostat 41, and the detector 35 is arranged to control a circuit 45, which is energized by a battery 46, and which is arranged to energize a telephonic receiver 47, or any other suitable signalling or receiving device.

For protecting the detector 35 from the disturbing effects of "atmospheric strays" or "static," or interference from high potential highly damped wave trains or other undesirable disturbing effects, this invention provides an auxiliary system or device 49, which may be connected across or shunted around either one of the hereinbefore described condensers 34 or 33, or the hereinbefore described inductance 27, or other suitable oscillatory part of the receiving system to limit the fluctuation in the potential in this part so that intense "stray" or "static" or interfering messages will produce substantially no greater effect on the receiving detector 35 than would be produced by a weak received message.

In the form of this invention shown in Fig. 1, this auxiliary system or device 49 comprises two pairs of thermionic valves including a primary valve 50 and a corresponding secondary valve 51, and a primary valve 52 and a corresponding secondary valve 53. These valves may be of any suitable construction, but in the form shown each of these valves includes a glass bulb or suitable container 55, which is evacuated and which contains a filament 56, a grid or potential gradient changing means 57, and a terminal or plate 58. Each filament 56 is arranged to be heated by a battery 60 acting through a variable resistance 61. Across the terminals of each of the heating batteries 60 of the two primary valves 50 and 52 is a resistance 65. These two resistances 65 are provided respectively with two sliding or adjustable contacts 66, which are connected respectively by two conductors 67 to two spaced terminals 68 and 69. The terminals 68 and 69 are joined through a resistance 70 and are connected respectively to the two grids 57 of the two secondary valves 53 and 51 by means of two conductors 71 and 72. These two conductors 71 and 72 are connected respectively through two high voltage batteries 73 to the two plates 58 of the two primary valves 50 and 52. Between each pair of valves 50 and 51, and 52 and 53, is a battery 75, one pole of which is connected by a conductor 76 to the plate 58 of the secondary valve 51 or 53, and the other pole of which is connected through a high resistance 77 to a conductor 78 which connects the two heating batteries 60 of the pair of valves 50 and 51, or 52 and 53. The grid 57 of each of the two primary valves 50 and 52 is connected by a conductor 80 to a tap 81, which is adjustably connected at a suitable point to the corresponding high voltage battery 75. The two terminals 68 and 69 are connected respectively by two conductors 85 and 86 to the opposite sides of the variable condenser 33. Instead of being connected to the opposite sides of the variable condenser 33, these two conductors 85 and 86 may be connected to the opposite sides of the stoppage condenser 34 or to the opposite sides or ends of the inductance 27, or across any other suitable part or element of the circuits which control the oscillation detector 35.

It is evident from the foregoing that the primary valve 50 and the corresponding secondary valve 51 of one of the hereinbefore described two pairs of valves are connected in parallel between the two terminals 68 and 69 so that these two valves act conjointly to permit a negative current to pass from the terminal 68 towards the terminal 69 and to prevent a positive current from passing through the valves from the terminal 68 towards the terminal 69; and it is also evident that the other primary valve 52 and the corresponding secondary valve 53 are arranged to permit a positive current to pass from the terminal 68 towards the terminal 69 and to prevent a negative current from passing from the terminal 68 towards the terminal 69.

In the operation of the form of this invention shown in Fig. 1, each of the primary valves 50 and 52 is preferably operated at a low heat so as to produce the well-known saturation current. The variable contact 66 of each primary valve 50 and 52 is preferably so adjusted together with the corresponding battery 73 that the characteristic plate current-grid voltage curve of each of the primary valves 50 and 52 is substantially as shown in Fig. 2 by the full curved line 90, which is plotted with respect to the two axes 91 and 92, which intersect at right angles and along which are measured respectively the plate current and volts on the grid. The filament 56 of each of the two secondary valves 51 and 53 is operated preferably although not necessarily at a higher temperature than the filament 56 of the corresponding primary valve 50 or 52, and the corresponding battery 75 is preferably so adjusted that the plate current-grid voltage curve of each secondary valve 51 and 53 is represented approximately by the full curved line 95 of Fig. 3.

When either secondary valve 51 or 53 is connected to the corresponding primary valve 50 or 52, as shown in Fig. 1, the grid 57 of the primary valve 50 or 52 is connected to such a point in the corresponding battery 75 by means of the tap 81 that the voltage between the grid 57 and the filament 56 of the primary valve 50 or 52 is practically zero. If now the voltage of the grid 57 of either secondary valve 51 or 53 should be increased positively, the current through the corresponding battery 75 and the corresponding resistance 77 would be increased accordingly, giving an increased drop in the resistance 77. This increased drop would act to make the grid 57 of the corresponding primary valve 50 or 52 negative with respect to the corresponding filament 56, and the plate current of the corresponding primary valve 50 or 52 would be correspondingly decreased.

Figure 4:
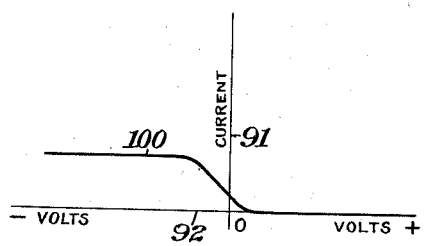

The combined characteristic curve representing the operation of either pair of valves 50 and 51, or 52 and 53, when connected without the resistance 70 between the two terminals 68 and 69 is shown in Fig. 4 by the full curved line 100. It is to be noted that this curved line 100 is a curve of plate current plotted against grid voltage. The slope of the curve 100 in Fig. 4 may be made much steeper than the slope of the hereinbefore described curve 90 in Fig. 2 by a proper adjustment of the battery 75 and the resistance 77. For instance, the total drop in current may take place in less than one tenth volt change in potential. The curve 100 of Fig. 4 may be moved horizontally towards the plus or minus volts by means of an adjustment of the corresponding contact 66 on the corresponding resistance 65. The secondary valve 51 and 53 serve to reverse the curve 90 of Fig. 2 and steepen it if desired.

Figure 5:
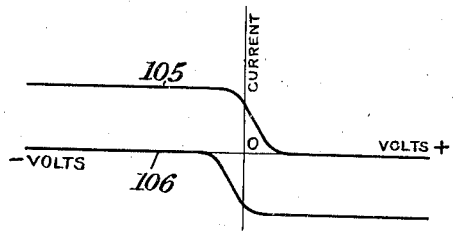
Figure 6:
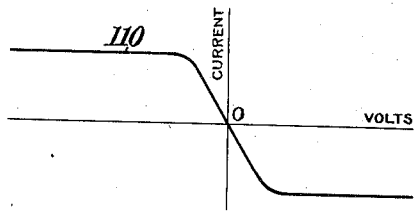

If both pairs of valves 50, 51 and 52, 53 be operated simultaneously, the operation of the two pairs of valves would be indicated diagrammatically and approximately by the two full curved lines 105 and 106 respectively as shown in Fig. 5, and these two curved lines 105 and 106 combined would give approximately the characteristic full curved line 110 shown in Fig. 6.

Figure 7:
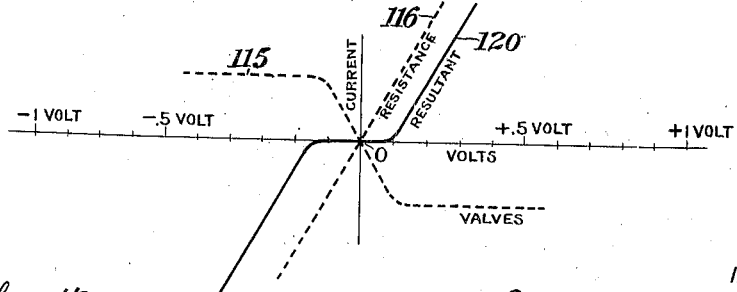

If now the resistance 70 be connected between the terminals 68 and 69, the resulting characteristic curve of the operation of the two pairs of valves may be obtained by adding or combining the curve 110 of Fig. 6 and a straight line representing the characteristic of the resistance 70, as shown in Fig. 7, the curve 110 of Fig. 6 being indicated in Fig. 7 by the dotted curved line 115, the straight line representing the characteristic of the resistance 70 being indicated by the straight dotted line 116, and the resultant curve being indicated by the full curved line 120.

From an examination of the resultant characteristic curve 120 in Fig. 7, it is evident that in the operation of this system a fluctuation of voltage of, for instance, one tenth of a volt on either side of the zero point or origin, between the two terminals 68 and 69 would produce no appreciable flow of current through the auxiliary system 49. For such voltage fluctuation, the auxiliary system 49 has very high equivalent resistance, and since the auxiliary system 49 is connected across the condenser 34 or 33 or across an inductance 27, this auxiliary system 49 in no way interferes with the reception of a signal of radiant energy, the fluctuation of voltage of which falls below the sharp bend of the curve 120. If, however, the voltage is slightly greater than say one tenth of a volt, which corresponds to points on the rising part of the curve 120 just past the sharp bend, then a relatively large current will flow through the auxiliary system 49, and the equivalent resistance of the auxiliary system 49 will fall to a few thousand ohms, or even to a few hundred ohms.

The auxiliary system 49 therefore acts, when connected across the stoppage condenser 34 or the variable condenser 33 or inductance 27, as a by-pass for all oscillations producing a voltage fluctuation greater than the small fluctuation up to the sharp bend in the curve 120, and, as a by-pass, acts to cut off the tops of intense voltage waves. Consequently, the voltage variation on the grid 38 of the receiving detector 35 of Fig. 1 will not be appreciably greater under the influence of intense signals than under the influence of relatively weak signals.

Figure 8:
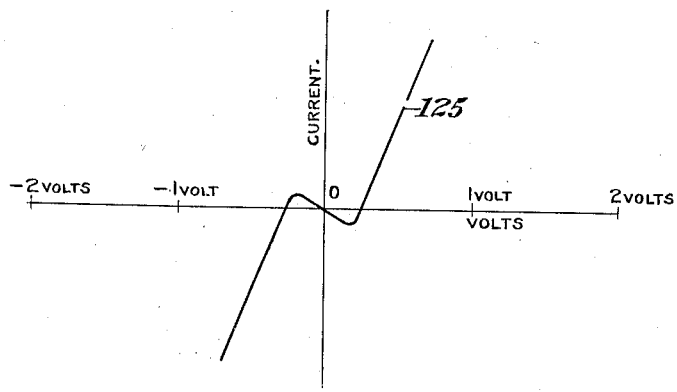

A modified form of characteristic curve of the auxiliary system 49 is shown approximately by the full curved line 125 of Fig. 8. This curve 125 shows a negative slope for the portion of the curve passing through the origin or zero. This negative slope represents a negative resistance which means that for fluctuations in potential which are confined to the negative slope of the curve, the auxiliary system 49 furnishes energy to still further increase the voltage fluctuation. Such a characteristic curve implies an amplification of a weak signal, but the reduction of the strong disturbances is effected in the same manner as hereinbefore described in connection with the curve 120 in Fig. 7.

In Fig. 9 is shown a modified form of protective auxiliary system 130 constructed in accordance with this invention. In this modified form, the construction is the same as hereinbefore described and shown in Fig. 1, except that instead of having the terminals 68 and 69 connected as shown in Fig. 1, by the resistance 70, these terminals are connected by a resistance 135 acting through a potentiometer 136, which is energized by a battery 137. The characteristic curve showing the operation of the valves 50 and 51 of this modified auxiliary system 130 is shown approximately by the dotted line 140 in Fig. 10, which is approximately the same as the curve 100 in Fig. 4. The characteristic curve of the resistance 135 and the potentiometer 136 is shown approximately by the dotted line 141 in Fig. 10. The resultant curve formed by combining the two curves 140, 141 is shown approximately by the full curved line 142 of Fig. 10. If the slope of the curve 140 be suitably increased and then combined with the curve 141 of the resistance 135 and potentiometer 136, the resultant curve would approximate the form shown by the line 125 in Fig. 8.

Another modified form 149 of the auxiliary protective system constructed in accordance with this invention is shown in Fig. 11. In this modified form 149, the construction is the same as in the form hereinbefore described and shown in Fig. 1, except that instead of having the two terminals 68 and 69 connected by the hereinbefore described resistance 70, this resistance is omitted and in place thereof two oppositely arranged thermionic valves 150 and 151 are substituted. These valves are constructed as hereinbefore described, and the filament 56 of each of these valves is arranged to be heated by a corresponding battery 152, across the poles of which is a potentiometer 153. The two filaments of the two valves 150, 151 are connected respectively through two corresponding batteries 155, 156 to the corresponding grids 57, thus giving the grids a positive potential. The potentiometer 153 of one, 150, of these valves is connected through the hereinbefore described conductor 67 to the hereinbefore described terminal 68, while the potentiometer 153 of the other valve 151 is connected through the hereinbefore described conductor 67 to the other hereinbefore described terminal 69. The two batteries 155 and 156 are provided respectively with two adjustable taps 160 and 161 which are connected respectively by two conductors 162 and 163 to the two plates or terminals 58 of the hereinbefore described primary valves 52 and 50 respectively, the hereinbefore described batteries 73 being omitted and the added batteries 155 and 156 being thus arranged to perform not only the functions of maintaining the corresponding grids 57 with a positive potential, but also performing the function of the omitted batteries 73.

In the operation of the modified form 149 of the auxiliary protective system shown in Fig. 11, the terminals 68 and 69 may be connected as hereinbefore described across the stoppage condenser 34, or across the variable condenser 33 or across inductance 27 of Fig. 1 by the hereinbefore described conductors 85 and 86.

In this modified form, shown in Fig. 11, the characteristic, plate current-plate voltage curve showing the operation of either one of the valves 150 or 151, when connected as shown in Fig. 11 and as just described, would be represented approximately by the full curved line 170 of Fig. 12. This curve 170 may be moved horizontally by a suitable adjustment of the corresponding potentiometer 153. If both valves 151 and 152 be operated simultaneously, their combined curves may be approximately any one of the curves 175, 176, 177 shown in Fig. 13, or other similar curves, according to the adjustments of the potentiometer 153. If one of these latter curves, which takes the place of the straight line resistance curve 116 in Fig. 7, be combined with the curves for the hereinbefore described primary valves 50 and 52 and secondary valves 51 and 53, the resultant curve would approximate either the curve 120 in Fig. 7 or the curve 125 in Fig. 8.

It is thought to be evident from the foregoing that when any one of the several forms of auxiliary systems shown in Figs. 1, 9 and 11 and hereinbefore described, is connected across the stoppage condenser 34, or the variable condenser 33, or the inductance 27, if the potential of the receiving system at the points of connection should be increased at any time either positively or negatively beyond a predetermined limit, above the limit ordinarily reached as a result of the reception of an ordinary wireless message, then the auxiliary system 49, 130 or 149, which would be normally inoperative up to a point where such limited potential had been passed, would instantaneously be rendered operative at the moment of reaching such peak or limit of potential to permit a sudden rush of current and a consequent leak of potential around the condenser, conductor or other part across which the auxiliary system might be connected to limit the variation in potential of such part and consequently to limit the produced oscillations in such part. When high voltage oscillations are being received by the open aerial circuit 25, if the amplitude of such oscillations should be suddenly increased beyond the limits predetermined by the auxiliary system 49, 130 or 149, then the auxiliary system would act as hereinbefore described to protect the oscillation detector 35 and to prevent any variation in voltage therein beyond the limits predetermined by the auxiliary system, while the excess of voltage would be rendered ineffective by the auxiliary system to interfere with the operation of the detector 35. In case of the reception by the open aerial circuit 25 of radiant oscillations having a variation of amplitude beyond the limits prescribed by the auxiliary system, the two sides of the auxiliary system, for instance the two pairs of valves 50 and 51, and 52 and 53, of Fig. 1, would act alternately to prevent any excess of amplitude of oscillation from reaching the detector 35. In the case of the open aerial circuit 25 receiving unidirectional pulsations, or pulsations either only of a positive or of a negative character, the corresponding side only of the auxiliary system 49, 130 or 149 would be thrown into operation to minimize or overcome the effect of any excess amplitude or voltage.

While only a few of the many forms have been shown in which this invention may be embodied, it is to be understood that the invention is not limited to any specific construction or arrangement but might be applied in various systems without departing from the spirit of the invention or the scope of the appended claims.

Having thus fully described this invention, I claim:

1. In a radio receiving system, the combination with an oscillation detector, of means to protect said detector from high potential effects of a given polarity, comprising a primary and a secondary thermionic valve connected in parallel to the detector circuit.

2. In a radio receiving system, the combination with an oscillation detector, of means to protect the same from high potential effects of either polarity, comprising two pairs of thermionic valves connected in parallel and in opposition to each other across two terminals of the detector circuit.

3. In a radio receiving system, the combination with an oscillation detector, of means including a primary and a secondary thermionic valve arranged to protect said detector from high potential effects of a given polarity, said valves being so arranged that the operation of one of said valves is modified by the operation of the other of said valves.

4. In a radio receiving system, the combination with an oscillation detector, of means including two pairs of thermionic valves arranged to protect said detector from high potential effects of either polarity, said valves being so arranged that the operation of one of each pair is modified by the operation of the other of said pair of valves.

5. In a radio receiving system, the combination with an oscillation detector, of means including a plurality of cooperating thermionic valves arranged to protect said detector from high potential effects of a given polarity, each of said valves comprising a container, a terminal, a grid, and ionizing means arranged in said container.

6. In a radio receiving system, the combination with an oscillation detector, of means including a plurality of cooperating thermionic valves arranged to protect said detector from high potential effects of either polarity, each of said valves comprising a container, a terminal, a grid, and ionizing means arranged in said container.

7. In a radio receiving system, the combination with an oscillation detector, of means including a plurality of cooperating thermionic valves arranged to protect said detector from high potential effects of a given polarity, each of said valves comprising a container, and a terminal, a grid, and ionizing means arranged in said container, and means electrically connecting the grid of one of said valves with the terminal of another of said valves.

8. In a radio receiving system, the combination with an oscillation detector, of means including a plurality of cooperating thermionic valves arranged to protect said detector from high potential effects of either polarity, each of said valves comprising a container, and a terminal, a grid, and ionizing means arranged in said container, and means electrically connecting the grid of one of said valves with the terminal of another of said valves.

9. In a radio receiving system, the combination with an oscillation detector, of means including a plurality of cooperating thermionic valves arranged to protect said detector from high potential effects of a given polarity, each of said valves comprising a container, and a terminal, a grid, and ionizing means arranged in said container, and means including a source of electric energy electrically connecting the grid of one of said valves with the terminal of another of said valves.

10. In a radio receiving system, the combination with an oscillation detector, of means including a plurality of cooperating thermionic valves arranged to protect said detector from high potential effects of either polarity, each of said valves comprising a container, and a terminal, a grid, and ionizing means arranged in said container, and means including a source of electric energy electrically connecting the grid of one of said valves with the terminal of another of said valves.

11. In a radio receiving system, the combination with an oscillatory element, of means for limiting the amplitude of oscillation of said element, including a plurality of pairs of thermionic valves connected in parallel across said element, each valve comprising a terminal, a grid, and ionizing means.

12. In a radio receiving system, the combination with an oscillatory element, of means for limiting the amplitude of oscillation of said element, including a plurality of thermionic valves connected across said element, each of said valves including a container, and a terminal, a grid and ionizing means arranged in said container.

13. In a radio receiving system, the combination with an oscillatory element, of means for limiting the amplitude of oscillation of said element, including a plurality of thermionic valves connected across said element, each of said valve including a container and a terminal, a grid, and ionizing means arranged in said container, and means electrically connecting the grid of one of said valves to the terminal of the other of said valves.

14. In a radio receiving system, the combination with an oscillatory element, of means including a plurality of devices connected across said element to limit the amplitude of oscillation of said element, a plurality of said devices being arranged to permit the flow of an electric current in a given direction across said element, and a plurality of said devices being arranged to permit the flow of electric current only in an opposite direction across said element.

15. In a radio receiving system, a combination with an oscillation detector, of means including a plurality of cooperating thermionic valves arranged to protect said detector from electrical effects having a maximum of potential beyond the predetermined potential and of a given polarity, and means including a plurality of cooperating thermionic valves arranged to protect said detector from electrical effects having a maximum of potential beyond the given potential and of a polarity opposite to said first-mentioned polarity.

16. In a system for minimizing high potential charges induced in a receiving system for radio signalling, a plurality of thermionic valves, each valve including a grid and a plate and said valves being cooperatively connected so as to mutually influence their respective plate current and grid voltage characteristics in such manner as to produce a critical leak for potential of over a predetermined voltage.

17. In a system for minimizing high potential charges induced in a receiving system for radio signalling, a plurality of thermionic valves, each valve including a grid and a plate and said valves being cooperatively connected so as to mutally influence their respective effective resistances in such a manner as to produce a critical leak for potential of over a predetermined voltage.

18. A system for protecting receivers of radio signals, comprising a plurality of thermionic valves connected in parallel with the receiver, each valve comprising ionizing means, a terminal and potential gradient changing means between the same, and said valves being so connected as to mutually influence their respective effective resistances, as to produce a critical leak for potential of over a predetermined voltage and of either polarity.

19. In an electrical system, a combination with a wave responsive device, of means operatively connected thereto for protecting said device from excessive potential effects, comprising two three-electrode thermionic valves connected in parallel and in opposition.

20. In an electrical system, a combination with a thermionic wave responsive device, of means operatively connected thereto for protecting said device from excessive potential effects, comprising two three-electrode thermionic valves connected in parallel and in opposition.

21. In an electrical system, a combination with an electrical device, of means operatively connected thereto for protecting said device from excessive potential effects, comprising two three-electrode thermionic valves connected in parallel and in opposition.

22. In a radio receiving system, a detector, an impedance electrically connected with the input side of the detector and means for protecting the detector from undesired potentials, comprising a three-electrode thermionic valve having its plate and filament connected across points on opposite sides of said impedance and a second three-electrode valve having its grid connected with the plate-filament circuit of the first-mentioned valve and having its own plate-filament circuit conductively connected with the grid of the first-mentioned valve.

23. In a radio receiving system a detector, an impedance electrically connected with the input side of the detector and means for protecting the detector from undesired potentials, comprising a pair of circuit arrangements connected to and oppositely arranged with respect to points on opposite sides of said impedance, each of said circuit arrangements comprising a three-electrode valve and means for automatically varying the charge on the grid of said valve under the control of potentials induced in the system from the ether.

24. In a radio receiving system, a detector, an impedance electrically connected with the input side of the detector and means for protecting the detector from undesired potentials, comprising a second impedance connected across points on opposite sides of said first-mentioned impedance, a pair of circuit arrangements connected in parallel with said second-mentioned impedance and oppositely arranged with respect thereto, each of said circuit arrangements comprising a three-electrode valve and means for automatically varying the charge on the grid of said valve under the control of potentials induced in the system from the ether.

This specification signed this 22nd day of April A. D. 1918.

EMORY LEON CHAFFEE.